United States Patent
Cherng et al.

(10) Patent No.: US 9,726,480 B2
(45) Date of Patent: Aug. 8, 2017

(54) RECOGNITION METHOD FOR A BATTERY CELL PACKAGE AND STRUCTURE THEREOF

(71) Applicant: AMITA TECHNOLOGIES INC LTD., Taoyuan County (TW)

(72) Inventors: Jing-Yih Cherng, Taoyuan County (TW); Po-Min Chuang, Taoyuan County (TW); Chia-Ching Lin, Taoyuan County (TW)

(73) Assignee: AMITA TECHNOLOGIES INC LTD., Taoyuan (TW)

( * ) Notice: Subject to any disclaimer, the term of this patent is extended or adjusted under 35 U.S.C. 154(b) by 229 days.

(21) Appl. No.: 14/693,234

(22) Filed: Apr. 22, 2015

(65) Prior Publication Data
US 2015/0308808 A1 Oct. 29, 2015

(30) Foreign Application Priority Data
Apr. 23, 2014 (TW) .............................. 103114759 A

(51) Int. Cl.
*H01M 2/02* (2006.01)
*G01B 21/02* (2006.01)

(52) U.S. Cl.
CPC .............. *G01B 21/02* (2013.01); *H01M 2/02* (2013.01); *H01M 2/0267* (2013.01)

(58) Field of Classification Search
CPC ........ H01M 2/00; H01M 2/02; H01M 2/0207; H01M 2/021; H01M 2/0212; H01M 2/0215; H01M 2/022; H01M 2/0222; H01M 2/0225; H01M 2/0227; H01M 2/023; H01M 2/0232; H01M 2/0235; H01M 2/0275

USPC ..... 206/703, 704, 705; 29/729, 730; 429/94, 429/149, 152, 153
See application file for complete search history.

(56) References Cited

U.S. PATENT DOCUMENTS

| 6,908,712 | B2* | 6/2005 | Aoshima et al. ..... | H01M 2/021 429/306 |
| 8,752,291 | B2* | 6/2014 | Johns et al. .............. | G09F 3/00 116/201 |

(Continued)

FOREIGN PATENT DOCUMENTS

| GB | 2307897 A | * | 6/1997 | ............... G09F 3/04 |
| GB | 2475612 A | * | 5/2011 | .............. H01M 2/34 |

(Continued)

*Primary Examiner* — R. A. Smith
(74) *Attorney, Agent, or Firm* — Chun-Ming Shih; HDLS IPR Services

(57) ABSTRACT

A recognition method for a battery cell package and a structure thereof includes: a) providing a plurality of battery cells arranged in a stack or in a wrapped roll; b) providing a tape, an isolation film or an electrode slat having a shape recognition structure; c) providing a packaging bag; d) placing the tape, the isolation film or the electrode slat at an outer layer of the battery cells; and e) placing the plurality of battery cells into the packaging bag and drawing an air out of the packaging bag such that an outer surface of the packaging bag reveals the shape recognition structure of the tape, the isolation film or the electrode slat. Therefore, the specifications and models of the battery cell packages can be determined with ease to facilitate the categorization and storage of the battery cell packages.

14 Claims, 8 Drawing Sheets

(56) References Cited

U.S. PATENT DOCUMENTS

| | | | | |
|---|---|---|---|---|
| 2004/0239291 | A1* | 12/2004 | Watanabe | H01M 2/1066 |
| | | | | 320/106 |
| 2007/0037048 | A1* | 2/2007 | Takeshita et al. | H01M 2/0404 |
| | | | | 429/99 |
| 2007/0166572 | A1* | 7/2007 | Wang | H01M 2/043 |
| | | | | 429/1 |
| 2008/0063918 | A1* | 3/2008 | Kajio | H01M 8/0269 |
| | | | | 429/457 |
| 2008/0301990 | A1* | 12/2008 | McDermott | G09F 3/005 |
| | | | | 40/633 |
| 2012/0058379 | A1* | 3/2012 | Kishi et al. | H01M 4/485 |
| | | | | 429/149 |
| 2012/0135301 | A1* | 5/2012 | Akita et al. | H01M 2/0212 |
| | | | | 429/185 |
| 2012/0202105 | A1* | 8/2012 | Shinyashiki et al. | H01M 2/22 |
| | | | | 429/153 |
| 2012/0244414 | A1* | 9/2012 | Inagaki et al. | H01M 4/485 |
| | | | | 429/149 |

FOREIGN PATENT DOCUMENTS

| | | | | |
|---|---|---|---|---|
| JP | 2009087628 A | * | 4/2009 | H01M 2/02 |
| WO | WO 2015137378 A1 | * | 9/2015 | H01M 2/0287 |

* cited by examiner

RECOGNITION METHOD FOR A BATTERY CELL PACKAGE AND STRUCTURE THEREOF

BACKGROUND OF THE INVENTION

Field of the Invention

The present invention is related to a package structure, in particular, to a recognition method for a battery cell package and a structure thereof Description of Related Art Lithium batteries, also known as secondary batteries and rechargeable batteries, are built with the function of electricity recharging. A multiple number of lithium batteries can be connected in series or in parallel to form a battery device in order to be used as a means of power source in various devices such as the battery device for an automobile or electric vehicle and so on.

A known soft package lithium battery is formed by a plurality of lithium battery cells. These lithium battery cells are enclosed inside a thin bag and one side thereof is provided with two electrode bars for connecting to the external power source; once the electrolyte is filled into and sealed inside the thin bag, vacuum process is performed on the thin bag to draw the air out of the bag in order to complete the assembly of the soft package lithium battery.

However, due to the difference in the amount of electricity required in various devices, different types of lithium batteries with numerous specifications are provided for wide application of uses. Nevertheless, there is a need to provide a way of recognizing these lithium battery packages with numerous specifications in order to facilitate the storage and categorization thereof, which is also the intension and motive for the inventor to satisfy such need.

In view of the above, to achieve the aforementioned objective, the inventor seeks to overcome the shortcomings by providing the present invention with a reasonable design and effectiveness after years of researches and application of academic principles and theories.

SUMMARY OF THE INVENTION

An objective of the present invention is to provide a recognition method for a battery cell package and a structure thereof such that lithium battery packages of numerous specifications can be recognized to facilitate the storage and categorization thereof without the increase of extra costs.

To achieve the aforementioned objective, the present invention provides a recognition method for a battery cell package, comprising: a) providing a plurality of battery cells arranged in a stack or in a wrapped roll; b) providing a tape, an isolation film or an electrode slat having a shape recognition structure; c) providing a packaging bag for accommodating the plurality of battery cells therein; d) placing the tape, the isolation film or the electrode slat in the Step b) at an outer layer of the plurality of battery cells; and e) placing the plurality of battery cells in the Step d) into the packaging bag and drawing an air out of the packaging bag such that an outer surface of the packaging bag reveals the shape recognition structure of the tape, the isolation film or the electrode slat.

To achieve the aforementioned objective, the present invention provides a recognition structure for a battery cell package, comprising a plurality of battery cells, at least one tape, isolation film or electrode slat and a packaging bag. The plurality of battery cells are arranged in a stack with each other or in a wrapped roll. The at least one tape, isolation film or electrode slat includes a shape recognition structure. The tape, the isolation film and the electrode slat is placed at an outer layer of the plurality of battery cells. The packaging bag includes the plurality of battery cells accommodated therein. Accordingly, once air inside the packaging back is drawn out, an outer surface of the packaging bag reveals the shape recognition structure of the tape, the isolation film or the electrode slat.

In comparison to the prior art, the recognition method for a battery cell package of the present invention is to form a shape recognition structure on the tape, isolation film or electrode slat and to place the tape, isolation film or electrode slat having the shape recognition structure at the outer layer of the battery cells arranged in a stack or in a wrapped roll. Finally, the battery cell is placed into the packaging bag and followed by drawing the air therein out. Since the packaging bag is a thin bag, such as an aluminum foil, the packaging bag is able to firmly attach to the surface of the battery cells after the air therein is drawn out. Subsequently, the location of the tape, isolation film or electrode slat can clearly reveal the shape recognition structure for viewing. Furthermore, by arranging or matching the tape, isolation film or electrode slat as well as their shape recognition structures in correspondence with the battery cell packages of various models, the user can then use the tape, isolation film or electrode slat as well as their shape recognition structures to recognize the specifications and models of the battery cell packages, which makes the categorization and storage of the packages convenient with improved practical applications.

DETAILED DESCRIPTION OF THE INVENTION

The following provides detailed description of embodiments of the present invention along with the accompanied drawings. It can, however, be understood that the accompanied drawings are provided for illustrative purposes only and shall not be treated as limitations to the present invention.

Figure 1:
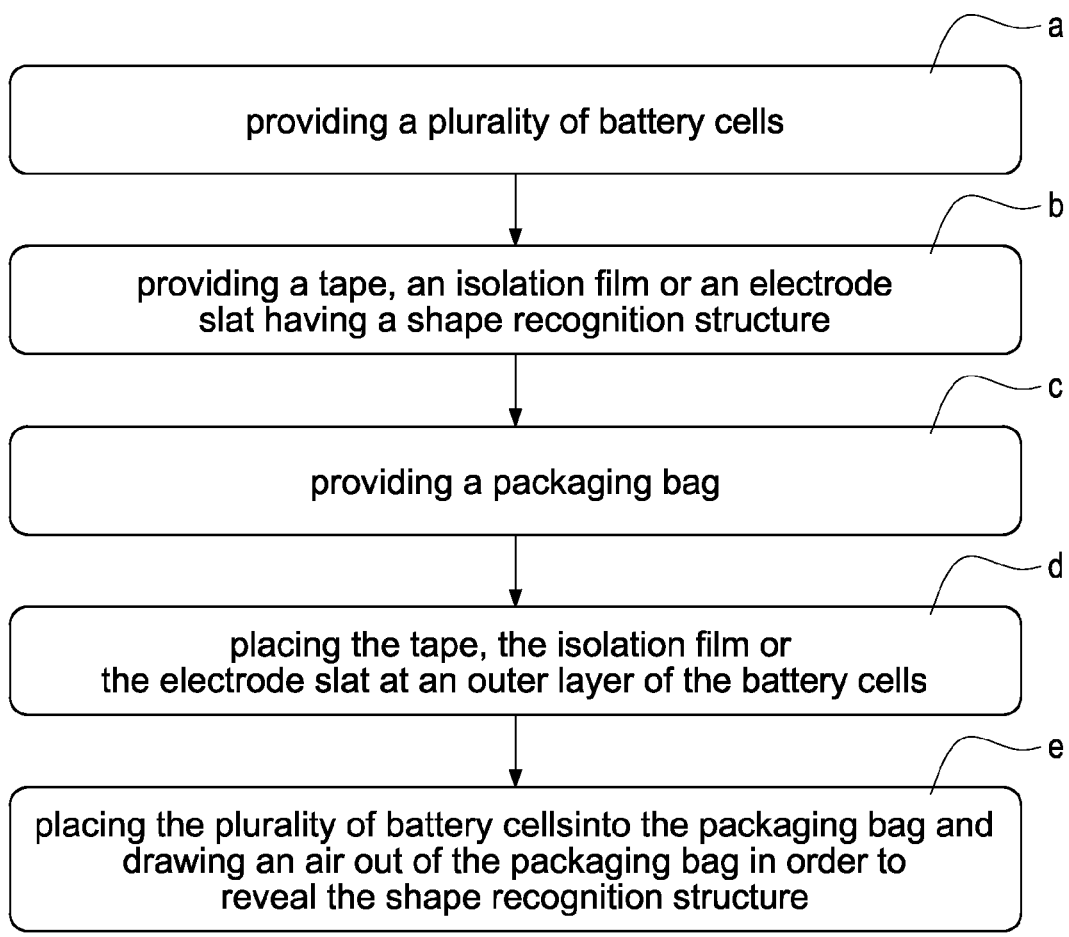
FIG. 1 is a flow chart of the recognition method for a battery cell package of the present invention.
Figure 2:
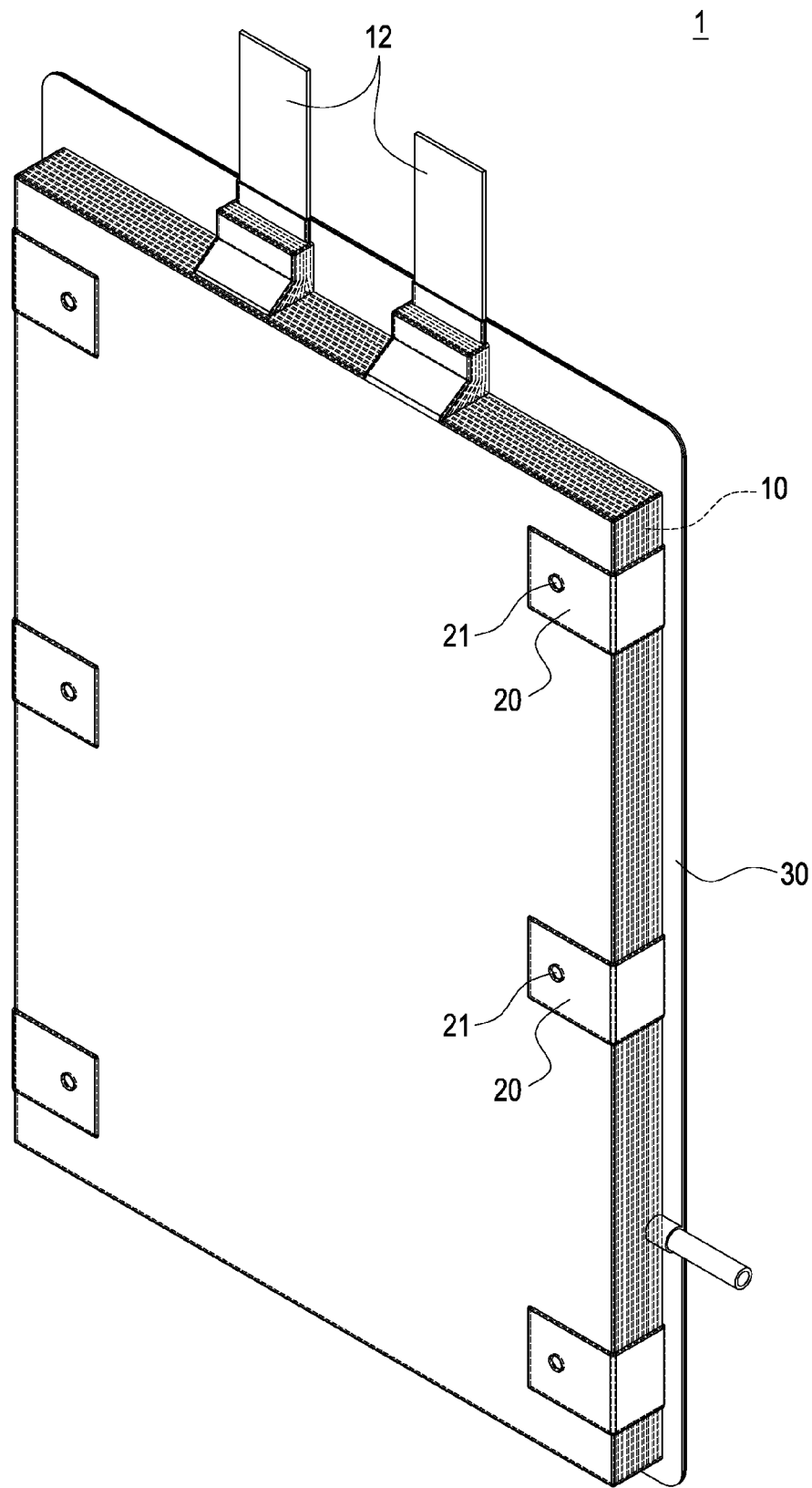
FIG. 2 is a perspective outer view of the recognition structure for a battery cell package of the present invention.
Figure 3:
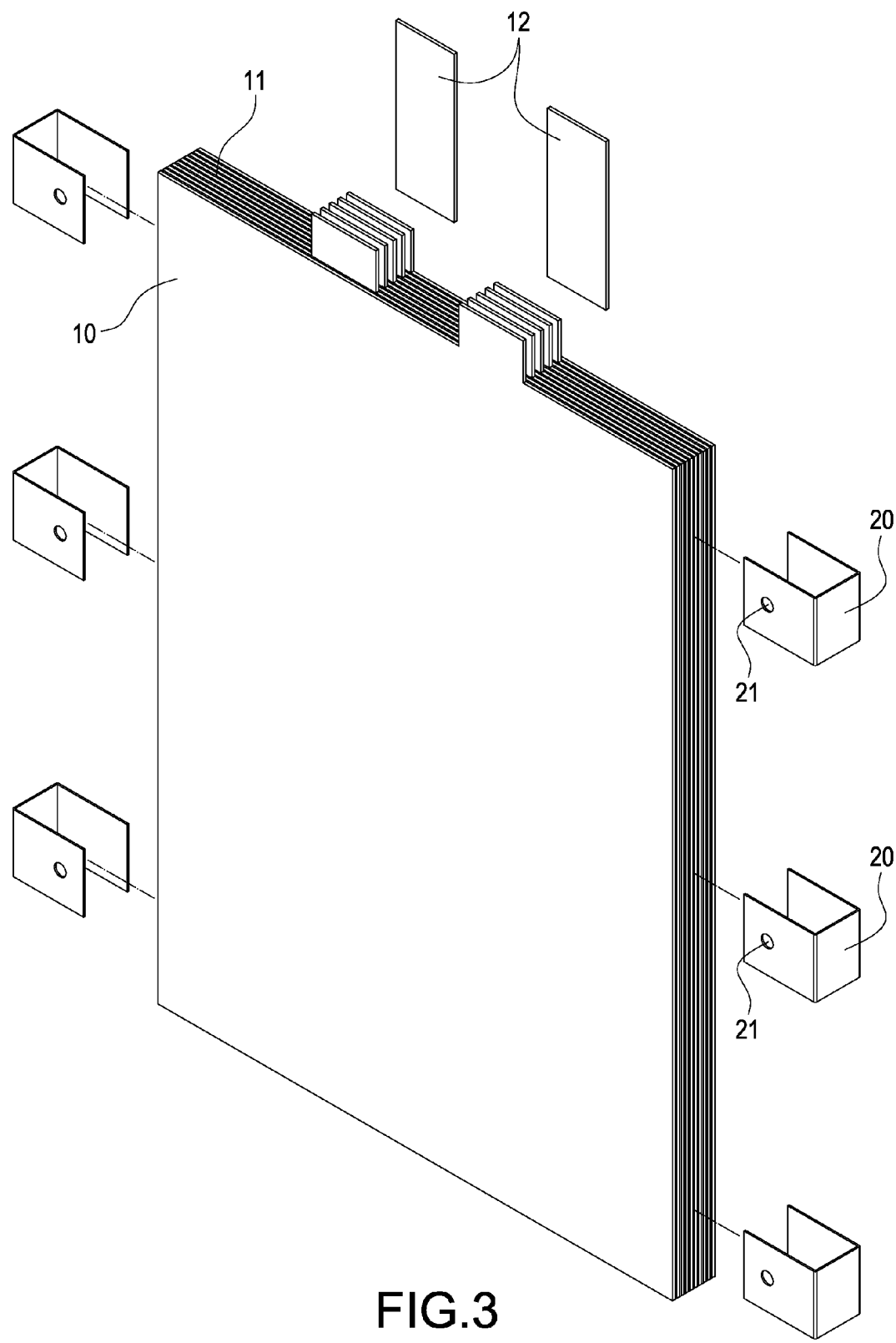
FIG. 3 is an exploded partial perspective view of the battery cell package of the present invention.
Figure 4:
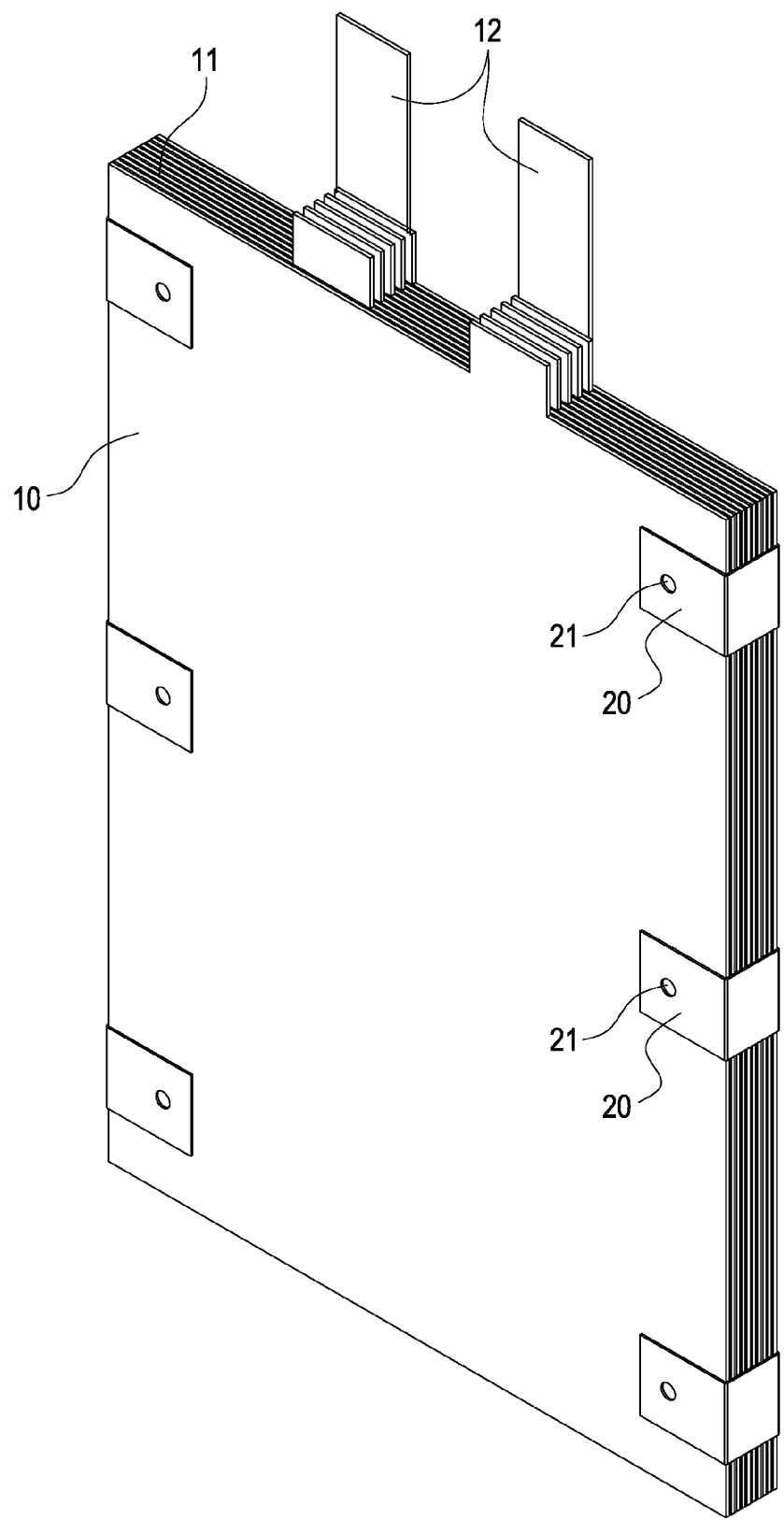
FIG. 4 is an assembly view of the battery cell package of the present invention.

Please refer to FIG. 1 to FIG. 4, showing the flow chart of the recognition method for a battery cell package, a perspective outer view of the recognition structure for a battery cell package, an exploded partial perspective view of the battery cell package and an assembly view of the battery cell package of the present invention respectively. As shown in FIG. 1, a recognition method for a battery cell package of the present invention is illustrated; in addition, please also refer to FIG. 2, in which the battery cell package 1 having the recognition structure formed in accordance to the method of FIG. 1 is illustrated.

The recognition method for a battery cell package of the present invention comprises the following steps: providing a plurality of battery cells 10 arranged in a stack or in a wrapped roll (Step a), a plurality of isolation films 11 (Steps a1) and a plurality of electrode slats 12 (Step a2). Following the above, it includes the step of providing at least one tape 20 having a shape recognition structure 21 (Step b). In this embodiment, the shape recognition structure 21 is disposed on the tape 20; in an actual practice, the shape recognition structure can also be disposed at the outer layer of the isolation film or electrode slat. In addition, it includes the step of providing a packaging bag 30 for accommodating the plurality of battery cells 10 (Step c). During the assembly of the battery cell package 1 of the present invention, the battery cells 10 are arranged in a stack with each other or a wrapped roll; the isolation films 11 are disposed between adjacent battery cells 10 respectively; and the electrode slats 12 are electrically connected to the battery cells 10.

In Step b, the tape 20 is placed on the outer layer of the battery cells 10. In this embodiment, in Step b, the tape 20 is formed as the tape 20 having the shape recognition structure 21 via a hole-punching method, which means that the shape recognition structure 21 is the hole formed on the tape 20. In an actual practice, the shape recognition structure 21 can also be disposed on the isolation film or the electrode slat of the outer layer of the battery cells 10.

Furthermore, the tape 20 having the shape recognition structure 21 is placed at the outer layer of the battery cells 10. Preferably, the tape 20 can be a polyimide tape, PE, PP or PET tape; however, the present invention is not limited to such types only. Since the material of the polyimide tape has a relatively high stability with excellent insulation and high temperature endurance, once it is attached to the outer layer of the battery cell 10, it is able to demonstrate excellent insulative and protective effects.

Finally, the battery cells 10 in Step d are then placed into the packaging bag 30. One end of the electrode slats 12 protrude out of the packaging bag 30, followed by drawing the air out of the packaging bag 30 for sealing and preservation purposes. Accordingly, the outer surface of the packaging bag 30 would then reveal the shape recognition structure 21 of the tape 20. In one embodiment of the present invention, the packaging bag 30 is configured to be a thin bag such as an aluminum foil bag.

Figure 5:
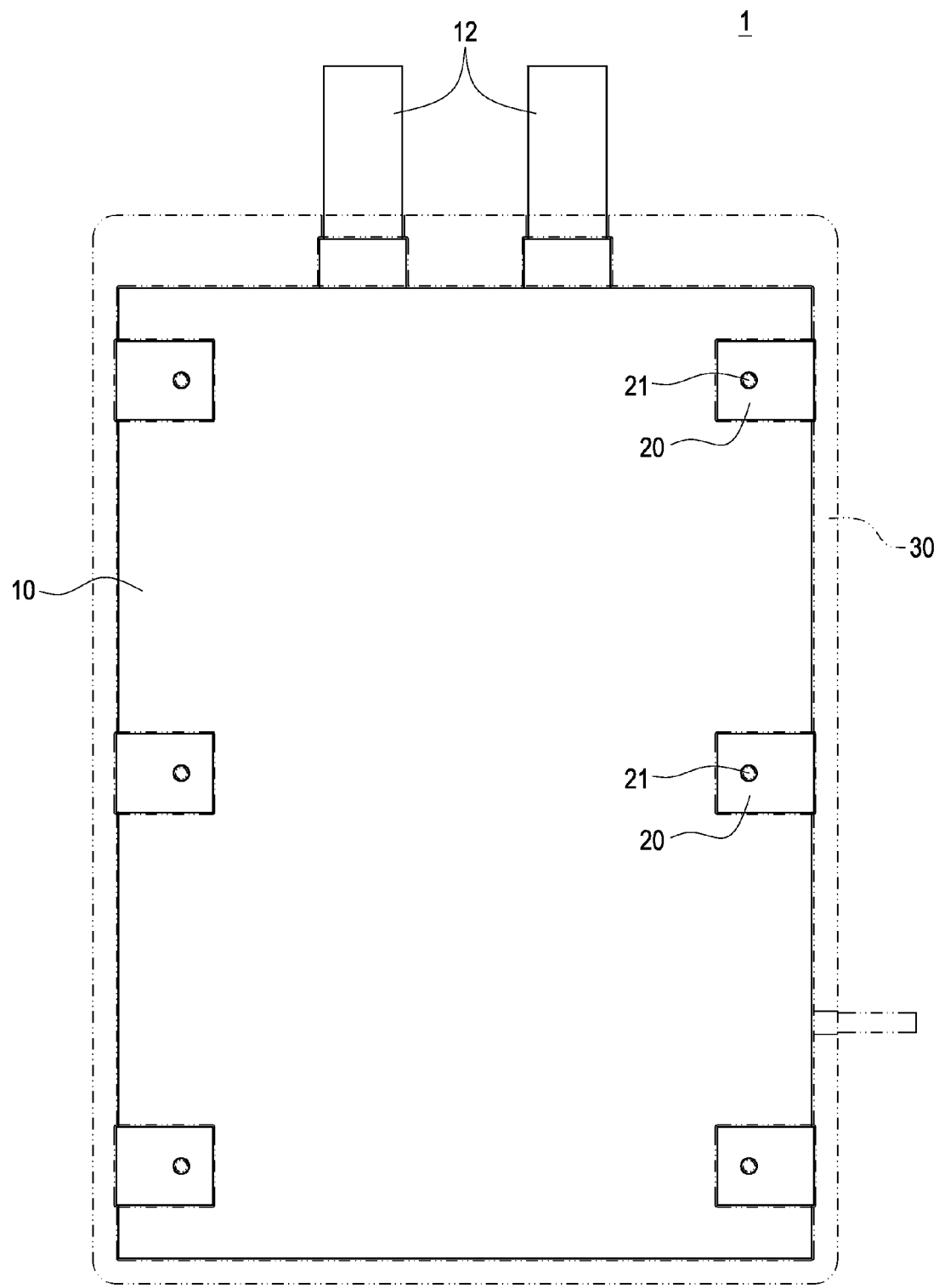
FIG. 5 is a plane view of the recognition structure for a battery cell package of the present invention.
Figure 6:
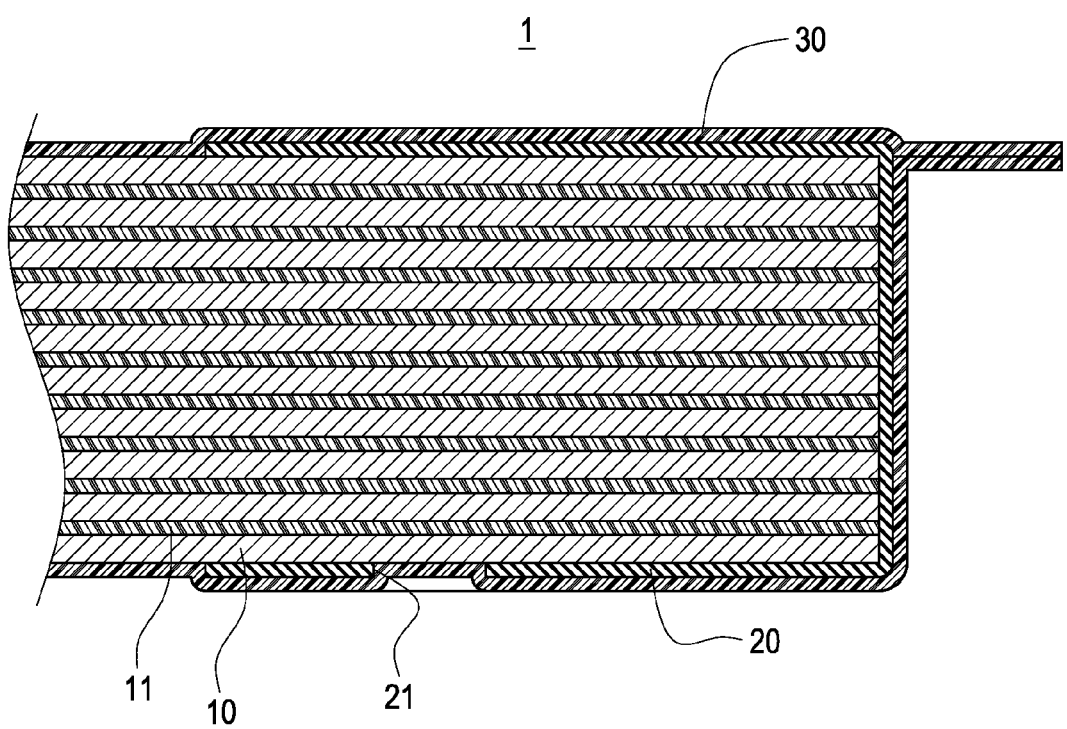
FIG. 6 is partial cross sectional view of the recognition structure for a battery cell package of the present invention.

Please continue to refer to FIG. 5 and FIG. 6, showing a plane view and a partial cross sectional view of the recognition structure for a battery cell package of the present invention respectively. As shown in FIG. 5, the packaging bag 30 includes a plurality of battery cells 10 accommodated therein, and the battery cells 10 are arranged in a stack with each other or in a wrapped roll. The battery cells 10 are attached to each other via the tape 20 having the shape recognition structure 21. In addition, once the air in the packaging bag 30 is drawn out, the outer surface of the packaging bag 30 would then reveal the shape recognition structure 21 of the tape 20.

Please refer to FIG. 6. Once the air is drawn out of the battery cell package 1, the packaging bag 30 would then be tightened to press onto the surface battery cells 10. Furthermore, since tape 20 having the shape recognition structure 21 is attached onto a portion of the surface of the battery cells 10, the location with the tape 20 attached thereto would then clearly reveal the shape recognition structure 21 for viewing. Accordingly, by arranging or matching the shape recognition structures 21 in correspondence with the battery cell package 1 with numerous models respectively, the user can then recognize the specification and model of the battery cell package 1 with ease such that the categorization and storage thereof can be facilitated.

Figure 7:
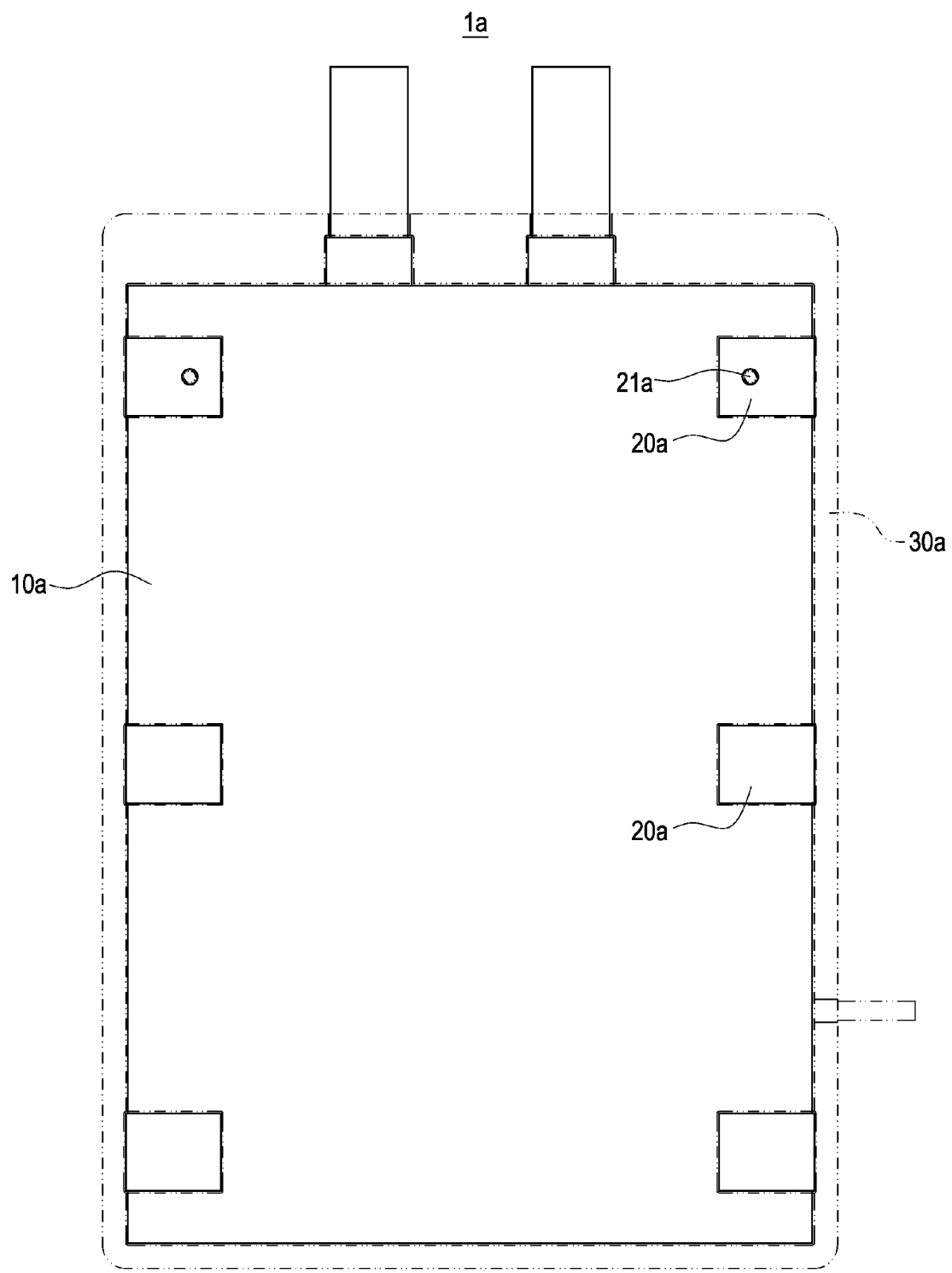
FIG. 7 is an illustration showing another application of the recognition structure for a battery cell package of the present invention.

Please refer further to FIG. 7, showing an illustration of another application of the recognition structure for a battery cell package of the present invention. As shown in FIG. 7, the battery cell package 1a comprises a plurality of battery cells 10a, a plurality of tapes 20a and a packaging bag 30a. The tapes 20a are spaced apart from each other and adhered firmly onto the circumference of the battery cells 10a. In addition, a portion of the tapes 20a include a shape recognition structure 21a disposed thereon, and the shape recognition structure 21a is a circular hole.

Once the air is drawn out of the packaging bag 30a, the outer surface of the packaging bag 30a would then reveal these tapes 20a and the location of the shape recognition structure 21a. Therefore, by utilizing a coding system for the location of these tapes 20a and its shape recognition structure 21a in correspondence with the specification of the battery cell package 1a, the specification and model of the battery cell package 1a can be determined from the locations of these tapes 20a and the shape recognition structure 21a.

Figure 8:
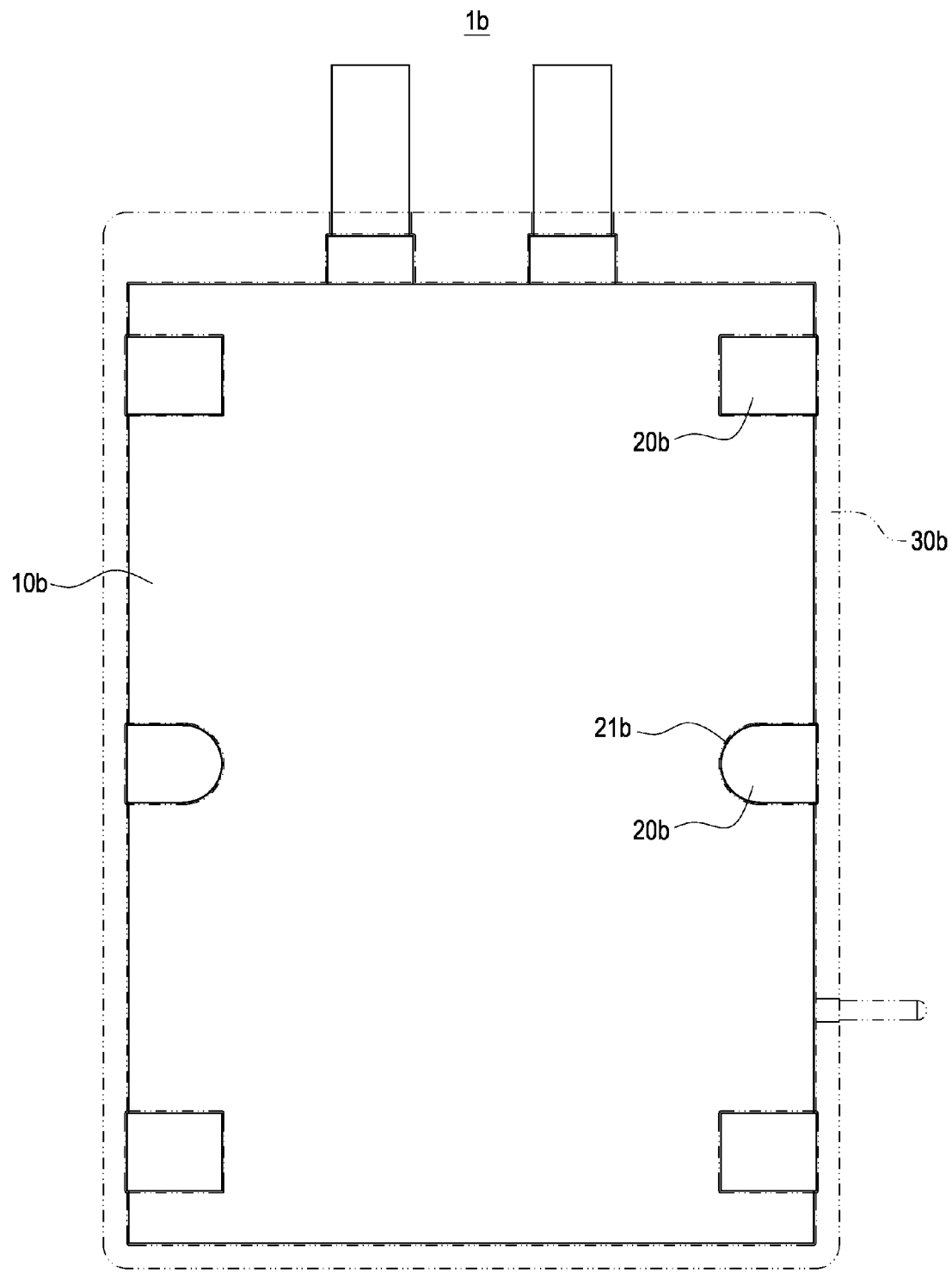
FIG. 8 shows a second embodiment of the recognition structure for a battery cell package of the present invention.

Please refer further to FIG. 8, showing a second embodiment of the recognition structure for a battery cell package of the present invention. In this embodiment, a battery cell package 1b comprises a plurality of battery cells 10a, a plurality of tapes 20b and a packaging bag 30b. The tapes 20b are spaced apart from each other and adhered firmly onto the circumference of the battery cells 10b. In addition, a portion of the tapes 20b are formed as the tapes having a shape recognition structure 21b via cutting by a cutting die, which means that the shape recognition structure 21b is formed by cutting in order to have the outer appearance of a semi-circular shape. Similarly, once the air inside the packaging bag 30 is drawn out and the bag is further sealed for preservation, the outer surface of the packaging bag 30b would then reveal these tapes 20b and the shape recognition structure 21b such that the specification and model of the battery cell package 1b can be determined readily.

The above descriptions on the embodiments of the present invention are provided for illustrative purposes only, which shall not be treated as limitations of the present invention. Any other equivalent modifications within the spirit of the present invention shall be deemed to be within the scope of the present invention.

What is claimed is:

1. A recognition method for a battery cell package, comprising:
   a) providing a plurality of battery cells arranged in a stack or in a wrapped roll;
   b) providing a tape, an isolation film or an electrode slat having a shape recognition structure, wherein the tape, the isolation film and the electrode slat are formed as the tape, the isolation film or the electrode slat having the shape recognition structure via a hole-punching method;
   c) providing a packaging bag for accommodating the plurality of battery cells therein;
   d) placing the tape, the isolation film or the electrode slat in the Step b) at an outer layer of the plurality of battery cells; and
   e) placing the plurality of battery cells in the Step d) into the packaging bag and drawing an air out of the packaging bag such that an outer surface of the packaging bag reveals the shape recognition structure of the tape, the isolation film or the electrode slat.

2. The recognition method for a battery cell package according to claim 1, further comprising a Step a1), providing a plurality of isolation films; wherein the plurality of isolation films are disposed between adjacent battery cells respectively.

3. The recognition method for a battery cell package according to claim 1, further comprising a Step a2), providing a plurality of electrode slats; wherein the plurality of electrode slats are electrically connected to the plurality of battery cells.

4. A recognition method for a battery cell package, comprising:
   a) providing a plurality of battery cells arranged in a stack or in a wrapped roll;
   b) providing a tape, an isolation film or an electrode slat having a shape recognition structure, wherein the tape, the isolation film and the electrode slat are formed as the tape, the isolation film or the electrode having the shape recognition structure slat via cutting by a cutting die;
   c) providing a packaging bag for accommodating the plurality of battery cells therein;
   d) placing the tape, the isolation film or the electrode slat in the Step b) at an outer layer of the plurality of battery cells; and
   e) placing the plurality of battery cells in the Step d) into the packaging bag and drawing an air out of the packaging bag such that an outer surface of the packaging bag reveals the shape recognition structure of the tape, the isolation film or the electrode slat.

5. The recognition method for a battery cell package according to claim 4, further comprising a Step a1), providing a plurality of isolation films; wherein the plurality of isolation films are disposed between adjacent battery cells respectively.

6. The recognition method for a battery cell package according to claim 4, further comprising a Step a2), providing a plurality of electrode slats; wherein the plurality of electrode slats are electrically connected to the plurality of battery cells.

7. A recognition structure for a battery cell package, comprising:
   a plurality of battery cells arranged in a stack with each other or in a wrapped roll;
   at least one tape, isolation film or electrode slat having a shape recognition structure; the tape, the isolation film and the electrode slat placed at an outer layer of the plurality of battery cells; and
   a packaging bag for accommodating the plurality of battery cells therein;
   wherein once air inside the packaging back is drawn out, an outer surface of the packaging bag reveals the shape recognition structure of the tape, the isolation film or the electrode slat;
   wherein the shape recognition structure is a hole formed on the tape, the isolation film or the electrode slat.

8. The recognition structure for a battery cell package according to claim 7, further comprising a plurality of electrode slats electrically connected to the plurality of battery cells, and one end of the plurality of battery cells protrudes out of the packaging bag.

9. The recognition structure for a battery cell package according to claim 7, wherein the tape is a polyimide, PE, PP or PET tape.

10. The recognition structure for a battery cell package according to claim 7, wherein the packaging bag is a thin bag.

11. A recognition structure for a battery cell package, comprising:
    a plurality of battery cells arranged in a stack with each other or in a wrapped roll;
    at least one tape, isolation film or electrode slat having a shape recognition structure; the tape, the isolation film and the electrode slat placed at an outer layer of the plurality of battery cells; and
    a packaging bag for accommodating the plurality of battery cells therein;
    wherein once air inside the packaging back is drawn out, an outer surface of the packaging bag reveals the shape recognition structure of the tape, the isolation film or the electrode slat;
    wherein the shape recognition structure is an outer shape formed at a circumference of the tape, the isolation film or the electrode slat.

12. The recognition structure for a battery cell package according to claim 11, further comprising a plurality of electrode slats electrically connected to the plurality of battery cells, and one end of the plurality of battery cells protrudes out of the packaging bag.

13. The recognition structure for a battery cell package according to claim 11, wherein the tape is a polyimide, PE, PP or PET tape.

14. The recognition structure for a battery cell package according to claim 11, wherein the packaging bag is a thin bag.

* * * * *